United States Patent
Weiss et al.

(10) Patent No.: US 12,487,162 B2
(45) Date of Patent: Dec. 2, 2025

(54) METHOD AND AEROSOL MEASURING DEVICE FOR DETERMINING A SOURCE-DEPENDENT PARTICLE SIZE DISTRIBUTION OF AN AEROSOL

(71) Applicant: PALAS GmbH PArtikel-und Lasermesstechnik, Karlsruhe (DE)

(72) Inventors: Maximilian Weiss, Weingarten (DE); Frederik Weis, Herxheim (DE)

(73) Assignee: Palas GmbH Partikel-UND Lasermesstechnik, Karlsruhe (DE)

( * ) Notice: Subject to any disclaimer, the term of this patent is extended or adjusted under 35 U.S.C. 154(b) by 54 days.

(21) Appl. No.: 17/958,958

(22) Filed: Oct. 3, 2022

(65) Prior Publication Data
US 2023/0024901 A1     Jan. 26, 2023

Related U.S. Application Data

(63) Continuation of application No. PCT/EP2021/058097, filed on Mar. 29, 2021.

(30) Foreign Application Priority Data

Apr. 2, 2020   (DE) .................. 10 2020 109 296.2

(51) Int. Cl.
*G01N 15/02*       (2024.01)
*G01N 15/0205*   (2024.01)
(Continued)

(52) U.S. Cl.
CPC ......... *G01N 15/0211* (2013.01); *G01N 15/06* (2013.01); *G01N 2015/0046* (2013.01); *G01N 15/075* (2024.01)

(58) Field of Classification Search
CPC ............... G01N 15/0211; G01N 15/06; G01N 15/0205; G01N 15/075; G01N 2015/0046
See application file for complete search history.

(56) References Cited

U.S. PATENT DOCUMENTS 4,375,334 A * 3/1983 Gerber ............... G01N 15/0205
                                                                356/336
7,084,401 B2   8/2006 Bell et al.
(Continued)

FOREIGN PATENT DOCUMENTS

CN      108680473 A    10/2018
DE      10113330 A1    10/2002
(Continued)

OTHER PUBLICATIONS

International Search Report dated Jun. 15, 2021 in corresponding application PCT/EP2021/058097.
(Continued)

*Primary Examiner* — Sang H Nguyen
(74) *Attorney, Agent, or Firm* — Muncy, Geissler, Olds & Lowe, P.C.

(57) ABSTRACT

A method for determining a source-dependent particle size distribution of an aerosol by an aerosol measuring device. First, a fraction parameter is determined that corresponds to a fraction of a source-dependent aerosol part of the aerosol. In addition, a particle size distribution of the aerosol particles is determined such that the source-dependent particle size distribution of the aerosol is determined from the fraction parameter and the particle size distribution. In terms of the device, the invention comprises an aerosol measuring device for determining a source-dependent particle size distribution of an aerosol, by means of which aerosol measuring device a fraction parameter can be determined that corresponds to a fraction of a source-dependent aerosol part of the aerosol. A particle size distribution of the aerosol particles can be determined such that the source-dependent particle size distribution of the aerosol can be determined from the fraction parameter and the particle size distribution.

17 Claims, 3 Drawing Sheets

(51) Int. Cl.
*G01N 15/06* (2024.01)
*G01N 15/00* (2006.01)
*G01N 15/075* (2024.01)

(56) References Cited

U.S. PATENT DOCUMENTS

| | | | | |
|---|---|---|---|---|
| 7,932,490 | B2* | 4/2011 | Wang | G01N 15/0205 73/30.01 |
| 10,634,599 | B2 | 4/2020 | Moenkemoeller | |
| 2003/0016357 | A1* | 1/2003 | Shofner | G01N 15/0211 356/337 |
| 2003/0197852 | A1* | 10/2003 | Johnson | G01N 15/04 356/37 |
| 2004/0144935 | A1* | 7/2004 | Xu | G01N 15/0211 250/573 |
| 2007/0110679 | A1* | 5/2007 | Hochrainer | G01N 15/0255 424/46 |
| 2013/0060509 | A1* | 3/2013 | Tsunoda | G06F 15/00 702/128 |
| 2014/0092386 | A1* | 4/2014 | Wei | G01J 3/18 356/338 |
| 2015/0020804 | A1* | 1/2015 | Van Der Mark | G01N 15/0211 128/203.14 |
| 2016/0109349 | A1* | 4/2016 | Volckens | G01N 1/2202 356/338 |
| 2022/0221389 | A1 | 7/2022 | Weiss et al. | |

FOREIGN PATENT DOCUMENTS

| | | |
|---|---|---|
| DE | 60205127 T2 | 5/2006 |
| DE | 102009000904 A1 | 9/2009 |
| DE | 102017001439 A1 | 8/2018 |
| DE | 102019003704 A1 | 12/2020 |

OTHER PUBLICATIONS

Ioar Rivas et al: Source apportionment of particle number size distribution in urban background and traffic stations in four European cities Environment International, vol. 135, Dec. 4, 2019.

* cited by examiner

METHOD AND AEROSOL MEASURING DEVICE FOR DETERMINING A SOURCE-DEPENDENT PARTICLE SIZE DISTRIBUTION OF AN AEROSOL

This nonprovisional application is a continuation of International Application No. PCT/EP2021/058097, which was filed on Mar. 29, 2021, and which claims priority to German Patent Application No. 10 2020 109 296.2, which was filed in Germany on Apr. 2, 2020, and which are both herein incorporated by reference.

BACKGROUND OF THE INVENTION

Field of the Invention

The present invention relates to a method and to an aerosol measuring device for determining a source-dependent particle size distribution of an aerosol.

Description of the Background Art

Within the context of the invention, aerosol denotes a mixture of a gas with solid and/or liquid suspended particles (aerosol particles), such as water droplets, soot particles, abraded material, pollen, bacteria, viruses and other organic and chemical substances. The particle size distribution refers to the concentration of the aerosol particles as a function of their particle sizes and provides information about how often which particle sizes are present in the aerosol.

Methods are known for determining the particle size distribution of an aerosol that are used to determine fine dust pollution, for example. The aerosol is always measured as a whole. If the composition of the aerosol changes, for example due to an aerosol source, a source-specific analysis is not possible using the known methods.

SUMMARY OF THE INVENTION

It is therefore an object of the present invention to provide a method and a device to eliminate the disadvantages of the prior art. In particular, better analysis of the aerosol should be made possible.

In an exemplary embodiment, the object is achieved by a method for determining a source-dependent particle size distribution of an aerosol by means of an aerosol measuring device, wherein aerosol particles of the aerosol flowing through a measuring cell are illuminated in the measuring cell with a light beam, scattered light is picked up by a sensor and scattered light signals of the aerosol particles are detected spectroscopically in terms of intensity, and a size distribution of the scattered light signals representative of a particle size distribution is created, wherein a fraction parameter is determined that corresponds to a fraction of a source-dependent aerosol part of the aerosol, wherein a particle size distribution of the aerosol particles is determined and wherein the source-dependent particle size distribution of the aerosol is determined from the fraction parameter and the particle size distribution.

In terms of the device, the object is achieved by an aerosol measuring device for determining a source-dependent particle size distribution of an aerosol, wherein aerosol particles of the aerosol are arranged in a measuring cell in such a way that the aerosol particles can be illuminated by a light beam, wherein scattered light of the aerosol particles can be picked up by a sensor and scattered light signals of the aerosol particles can be spectroscopically detected in terms of intensity such that a size distribution of the scattered light signals that is representative of a particle size distribution can be created, wherein a fraction parameter can be determined that corresponds to a fraction of a source-dependent aerosol part of the aerosol, wherein a particle size distribution of the aerosol particles can be determined and wherein the source-dependent particle size distribution of the aerosol can be determined from the fraction parameter and the particle size distribution.

In addition, the object is achieved by a computer program having program code, which computer program is configured to carry out the steps of a method according to the invention when the computer program is executed on a computer or a corresponding computing unit.

The invention is based on the basic idea that an aerosol source (hereinafter "source") changes the composition of the aerosol such that the aerosol has a source-dependent and a source-independent fraction. An example of a source within the context of the invention is a person who is in the region of the aerosol, wherein the exhaled air of the person as an example of a source-dependent aerosol within the context of the invention changes the composition of the aerosol and in particular causes microbial contamination of the aerosol. In this respect the air exhaled by a person is for example to be understood within the context of the invention as a source-dependent aerosol part, wherein the particle size distribution of the exhaled air represents the corresponding source-dependent particle size distribution in this case. Within the context of the invention, the fraction parameter corresponds to the fraction of the source-dependent aerosol or aerosol part of the total aerosol and allows the source-dependent particle size distribution to be determined, which source-dependent particle size distribution relates to the aerosol of the source, for example the exhaled air of the person. The invention allows the source-dependent particle size distribution, which corresponds to the source-dependent part of the (entire) aerosol, to be characterized, which allows improved analysis of the aerosol. In terms of the device, the same applies to the aerosol measuring device according to the invention.

The fraction parameter can be determined from a comparison of two particle size distributions of the aerosol, in which case the comparison can in particular comprise the formation of a difference and/or a quotient in order to easily determine the fraction parameter. At least one of the particle size distributions can be a theoretical particle size distribution and/or a particle size distribution determined by measured values. Preferably, one of the particle size distributions is a source-dependent particle size distribution.

The fraction parameter can be determined from a comparison of a parameter of at least one gas component of the aerosol with a source-dependent reference value, which represents a rapid method for determining the fraction parameter. The reference value can, for example, be user-defined and/or determined from a previous measurement. In the latter case, the reference value is determined, for example, from a series of measurements carried out over a period of 24 hours. Gas components within the context of the invention can in particular be at least one substance from the following group: carbon oxides, nitrogen oxides, sulfur oxides, ozone, and volatile organic compounds (VOC).

The parameter of the at least one gas component may be its concentration in the aerosol and/or the source-dependent reference value preferably corresponds to a source-dependent concentration of the gas component. To determine the fraction parameter, the concentration of carbon dioxide in the aerosol is particularly preferably compared with a reference value of between 1% and 10%, in particular between 3% and 5%, in particular with a reference value of 4%, wherein a reference value of 4% (40,000 ppm) corresponds to the concentration of carbon dioxide in human breath. A particularly reliable method results from using the concentration of carbon dioxide to determine the fraction parameter.

In order to determine in particular the fraction of exhaled air in the aerosol as a fraction parameter, the concentration of carbon dioxide in the aerosol is divided by the concentration of carbon dioxide in exhaled air (4%), for example.

In order to improve the accuracy of the method, the parameter of the at least one gas component and/or the reference value can be corrected. The correction can comprise, for example, compensating for the influences of atmospheric air, these influences being assumed to be models and/or being determined by a series of measurements carried out over a period of time. In an advantageous embodiment of the invention, the correction value is determined by a series of measurements over a user-defined time interval, for example 24 hours, the correction value corresponding in particular to the minimum of the measurements. For example, the effects of atmospheric air on the parameter and/or on the reference value can be corrected by subtracting corresponding values to perform a simple correction. In particular, a value of about 0.05% can be subtracted from the determined concentration of carbon dioxide in the aerosol and from the concentration of carbon dioxide in exhaled air. The correction can also comprise effects of humidity, in particular the relative humidity. As an alternative or in addition to this, the correction can comprise standardization or normalization.

The method is preferably terminated if the fraction parameter falls below a first user-defined value and/or if the fraction parameter exceeds a second user-defined value. For example, the method is terminated if the value of the fraction parameter shows that there is no source-dependent part of the aerosol and/or the composition of the aerosol has not changed.

The determined particle size distribution of the aerosol can be corrected to eliminate interfering background influences. In particular, standardization or normalization can be carried out for the correction. Humidity effects on the particle size distribution are preferably compensated for in the correction. In addition, the correction can be carried out based on a particle size distribution, which can be determined theoretically and/or is determined based on previous measurements. In particular, the correction can be made using a determined particle size distribution that was determined at a user-defined concentration of carbon dioxide, for example at a carbon dioxide concentration of 400 ppm.

Downsampling and/or compression of the determined particle size distribution and/or the source-dependent particle size distribution can be carried out to accelerate the method.

The source-dependent particle size distribution can be determined by multiplying the particle size distribution of the aerosol by the fraction parameter, which is preferably done for each value of the particle size distribution.

A quality parameter of the aerosol that corresponds to the quality thereof can be determined from at least part of the source-dependent particle size distribution in order to easily characterize the quality of the aerosol. The quality parameter may correspond to the air quality. Determining the quality parameter also can also comprise summing at least part of the source-dependent particle size distribution. In particular, the $PM_{2.5}$ value of the source-dependent particle size distribution is a quality parameter within the context of the invention and corresponds to the fraction of aerosol particles having particle diameters of less than 2.5 μm of the source-dependent aerosol, for example of the exhaled air. To determine the quality parameter, the source-dependent particle size distribution can be at least in part interpolated and/or integrated.

Determining the quality parameter may comprise weighting that depends, for example, on the particle size of the aerosol particles and/or on a parameter of at least one gas component and/or on the relative humidity of the aerosol.

Determining the fraction parameter and/or the particle size distribution and/or the source-dependent particle size distribution and/or the quality parameter may comprise determining individual values and a statistical evaluation of the individual values in order to improve the accuracy of the parameters determined. In particular, a user-defined number of determinations can be made over a user-defined period of time, the individual values being evaluated by averaging, in particular by a moving averaging.

In terms of the device, the aerosol measuring device can have an electronic processor that is designed to carry out the steps of a method according to the invention. The aerosol measuring device can have a gas measuring unit that is designed to determine the concentration of at least one gas component of the aerosol. For this purpose, the gas measuring unit has in particular at least one gas sensor. The gas measuring unit can be designed to detect at least one of the following substances and/or parameters, in particular a member of the group: carbon oxides, nitrogen oxides, sulfur oxides, ozone, volatile organic compounds, and/or relative humidity.

The light beam of the aerosol measuring device has, in particular, polychromatic and/or laser light. The direction of movement of the aerosol particles in the measuring cell, the direction of the light beam in the measuring cell and the direction of the scattered light can be arranged in pairs perpendicular to one another. The aerosol measuring device preferably has an output that is designed to output information, it being possible for the information to be assigned to the source-dependent particle size distribution, in particular the quality parameter. The output can in particular have a display.

The aerosol measuring device can also have a conveyor in order to convey the aerosol particles to the measuring cell, the conveyor having a pump and/or a fan, for example.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic view of an aerosol measuring device in an aerosol to be measured;

FIG. 2 shows a schematic design of the aerosol measuring device of FIG. 1;

FIG. 3 shows a flowchart of a method according to the invention;

DETAILED DESCRIPTION

Figure 1:
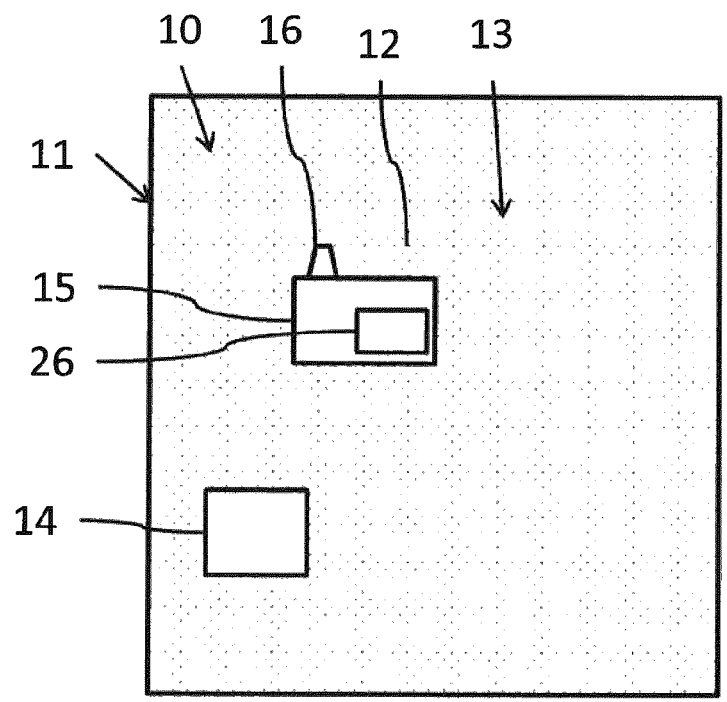

FIG. 1 shows a schematic view of an aerosol 10 in a closed region 11, the aerosol 10 containing solid and liquid aerosol particles 12 in a gas 13, for example air. Aerosol particles 11 are, for example, water droplets, soot particles, abraded material, pollen and/or other organic and chemical substances. A person is located in the region 11 as an aerosol source 14. It is assumed below that the aerosol 10 changes within the region 11 substantially as a result of the exhaled air of the person 14. The aerosol 10 of the region 11 therefore has a source-dependent aerosol part 10a, in this case the exhaled air, and a source-independent aerosol part 10b.

An aerosol measuring device 15 in the form of an aerosol spectrometer is arranged in the region 11 of the aerosol 10, which aerosol measuring device measures a particle size distribution $c_n$ of the aerosol particles 12 of the aerosol 10 as a function of their particle diameters $d_p$. For this purpose, the aerosol particles 12 are drawn through an access opening 16 of the aerosol measuring device 15 and through a flow tube 17 by means of a conveyor arranged downstream, the conveyor being designed as a pump. In the outlined design of the aerosol measuring device 15 according to FIG. 2, the flow tube 17 is arranged perpendicularly to the plane of the drawing.

The aerosol particles 12 are irradiated in the flow tube 17, perpendicularly to their flight direction, with a collimated light beam 18 made up of polychromatic light from a light source 19 and a lens 20. Because of the scattering processes that take place as a result, the aerosol particles 12 emit scattered light 21 that impinges on a converging lens 22 perpendicularly to the flight direction of the aerosol particles 12 and perpendicularly to the irradiation direction of the light from the light source 19. The converging lens 22 focuses the scattered light 21 onto an optoelectrical sensor 23 that converts the scattered light 21 into electrical signals. An electronic processor 24 uses the electrical signals to determine the particle size distribution $c_n$ as a function of the particle diameter $d_p$ of the aerosol particles 12. The spatial overlap of the light beam 18 of the measured scattered light 21 and of the detected part of the aerosol particles 12 in the flow tube 17 defines a virtual spatial measuring cell 25 in which the particle size distribution $c_n$ is determined.

During the measurement, the light intensity of the scattered light 21 and thus also the resulting electrical signal strength is a measure of the particle size of the aerosol particles 12 to which a particle diameter $d_p$ is accordingly assigned. The measured particle size distribution $c_n$ depends on the particle diameter $d_p$ such that the following applies: $c_n = f(d_p)$.

The determined particle size distribution $c_n$ is determined for discrete particle diameters $d_p$ as measuring points, up to 256 channels being used as a rule. In order to improve accuracy, the progression of the particle size distribution $c_n$ between the measurement points is locally interpolated by means of cubic splines during the evaluation in the electronic processor 24 such that a continuous progression results. To accelerate the method according to the invention described below, the particle size distribution $c_n$ is determined by means of downsampling for 32 channels.

A reference particle size distribution $c_r$ is subtracted from the determined particle size distribution $c_n$, the reference particle size distribution $c_r$ being a model distribution that corresponds to normal room air and has a carbon dioxide concentration of approximately 400 ppm.

The aerosol measuring device 15 has a gas measuring unit 26 that is designed as a gas sensor and determines the concentration $k_{CO2}$ of carbon dioxide ($CO_2$) in the aerosol, which corresponds to the volume fraction of $CO_2$ in the aerosol 10 within the context of the invention. This value is transmitted to the electronic processor 24.

Figure 2:
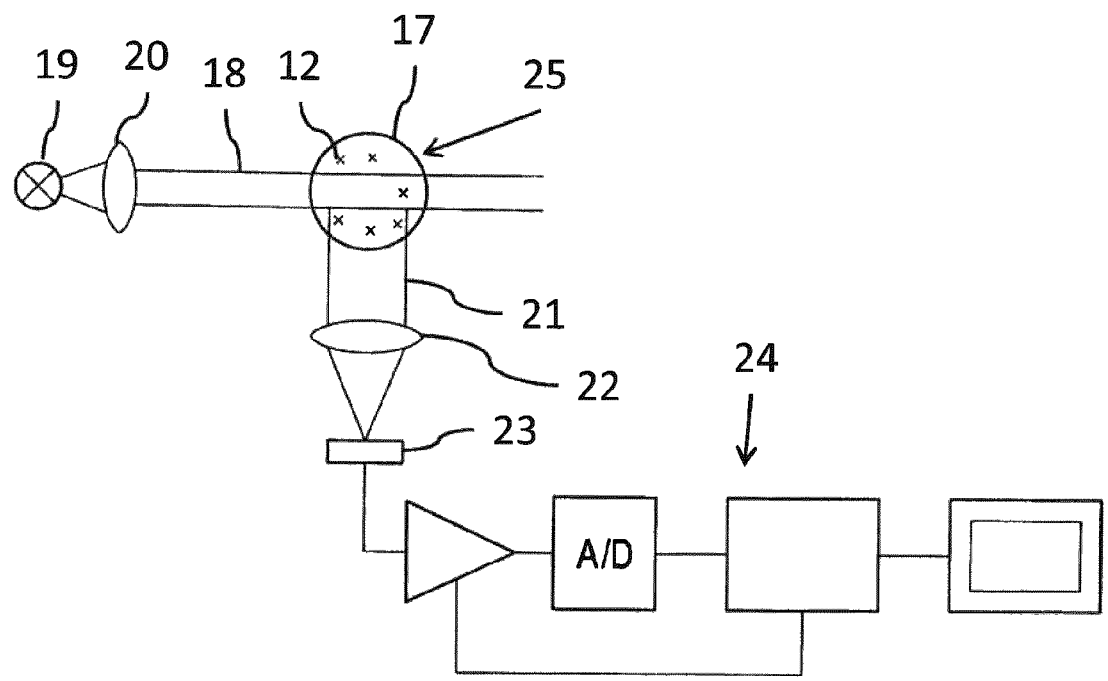
Figure 3:
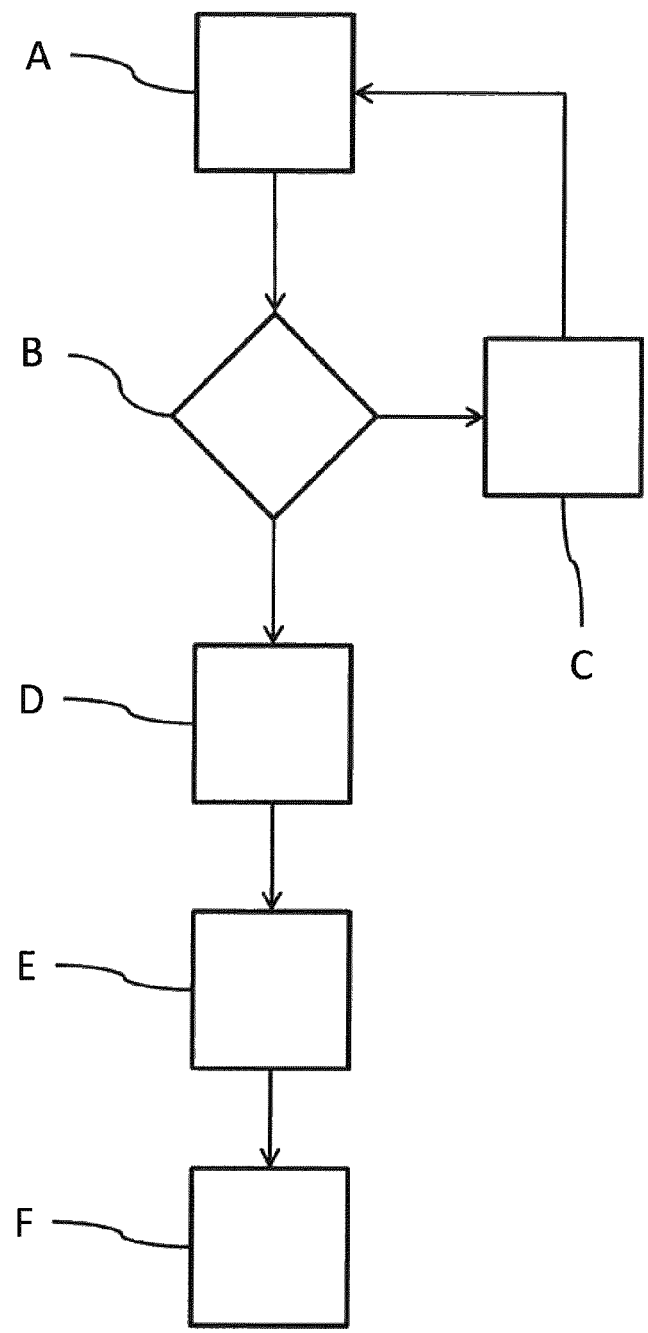

An embodiment of the method according to the invention according to FIG. 2 is described below in which the source-dependent particle size distribution $c_n'$ is determined, which corresponds to the source-dependent aerosol part 10a and is associated with the air exhaled by the person 14. Within the context of the invention, this particle size distribution $c_n'$ is referred to as the source-dependent particle size distribution. In particular, the risk of infection within the region 11 as a result of the microbial contamination of the aerosol 10 is determined by the method.

In a first step A of the method, the fraction parameter f is determined. For this purpose, the $CO_2$ concentration $k_{CO2}$ in the aerosol 10 is determined by the gas sensor 26 and transmitted to the electrical processor 24. A reference concentration $k_{ref}$ is subtracted from the $CO_2$ concentration $k_{CO2}$, which corresponds to the usual $CO_2$ concentration of room air and is approximately 0.05% in the present example. The reference concentration $k_{ref}$ is determined by measuring the $CO_2$ concentration of the aerosol 10 at an interval of one measurement per hour over a period of 24 hours and forming the minimum of these measured values. Because the source-dependent particle size distribution $c_n'$ to be determined in the present example corresponds to breathing air, the reference concentration $k_{ref}$ is also subtracted from the $CO_2$ concentration of exhaled air, in this case approximately 4%. The result is a corrected $CO_2$ concentration $k_{CO2}'$ of the aerosol 10 and a corrected reference concentration $k_{ref}'$. The quotient of these two variables results in an individual value $f_i$ for the fraction parameter f of the breathing air 10a in the aerosol 10. The individual values $f_i$ of the fraction parameter f are continuously determined over a period of 30 minutes, the fraction parameter f being formed from the individual values as a moving average value.

In a next step B, the fraction factor f is queried. If there is not a person 14 within the region 11, a value of 0 results for the fraction parameter f, whereupon the method is terminated C and the method restarts after a user-defined time interval.

If the query B results in a value for the fraction parameter greater than 0, the method is continued and the particle size distribution $c_n$ of the aerosol 11 is determined D in the manner described above. The aerosol measuring device 15 continuously determines the particle size distribution $c_n$ of the aerosol 10 at a measuring frequency of one measurement per minute and forms the particle size distribution $c_n$ used below as a moving average.

The source-dependent particle size distribution $c_n'$ is then determined E by multiplying the particle size distribution $c_n$ of the aerosol 10 by the fraction parameter f, which is done for each measurement channel in the present example.

Figure 4:
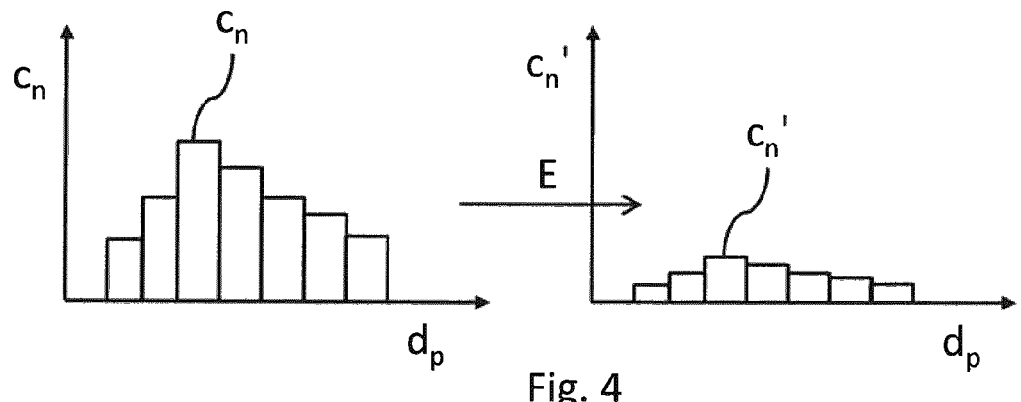
FIG. 4 shows a first particle size distribution having a first source-dependent particle size distribution.
Figure 5:
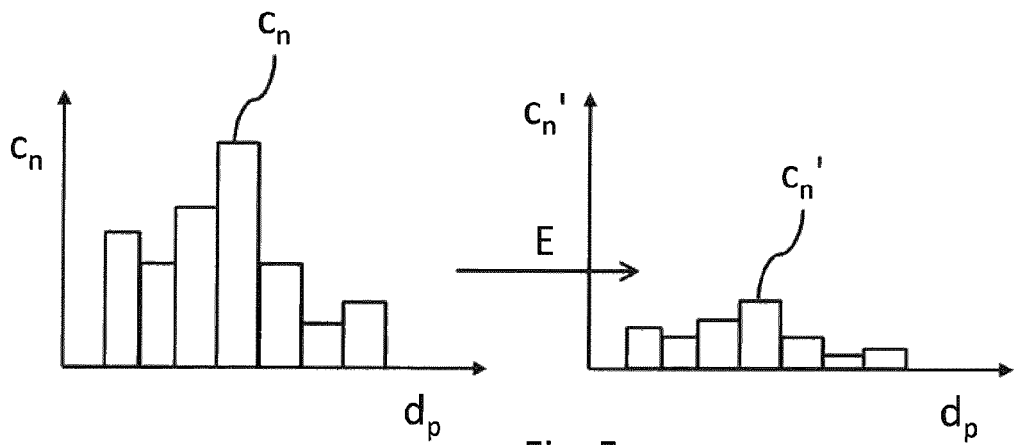
FIG. 5 shows a second particle size distribution having a second source-dependent particle size distribution.
Figure 6:
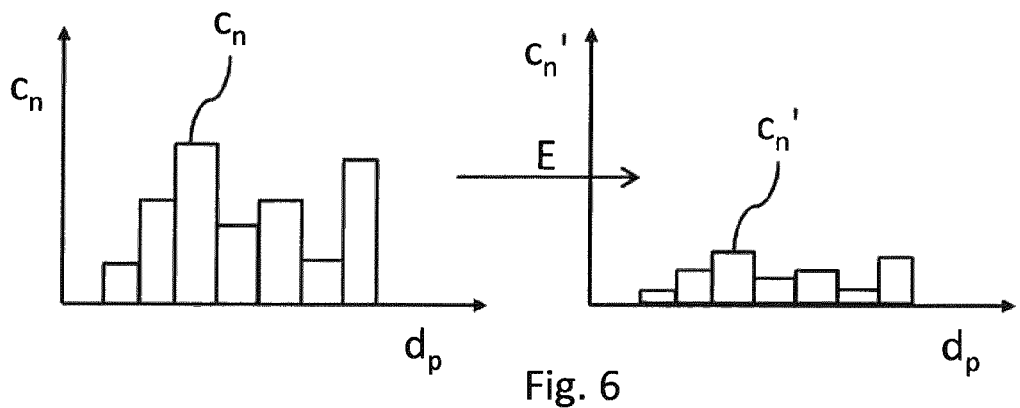
FIG. 6 shows a third particle size distribution having a third source-dependent particle size distribution.

The determination E of the source-dependent particle size distributions $c_n'$ is shown in FIGS. 4 to 6, which show an exemplary particle size distribution $c_n$ of the aerosol 10 on the left-hand side and a source-dependent particle size distribution $c_n'$ on the right-hand side. The particle size distributions $c_n$, $c_n'$ are each illustrated there as bar charts as a function of the particle diameter $d_p$. For reasons of clarity, the particle size distributions $c_n$, $c_n'$ each have 7 measured values. In FIG. 4, the fraction factor is approx. 0.28, in FIG. 5 approx. 0.3 and in FIG. 6 approx. 0.32. From this it can be seen that the fraction factor f has increased in the transition from the particle size distribution $c_n$ of FIG. 4 to the particle size distribution $c_n$ of FIG. 6. This indicates that the person 14 may have stayed in the region 11 for a longer period of time and that the fraction of breathing air 10a in the aerosol 10 is continuously increasing.

After the source-dependent particle size distribution $c_n'$ is determined E, quality parameters g are determined F, which quality parameters are assigned to the source-dependent particle size distribution $c_n'$ and are described below.

The total number $g_1$ of aerosol particles 12 in the source-dependent particle size distribution $c_n'$ is determined by summing up the source-dependent particle size distribution $c_n'$ across all channels. Because the source-dependent particle size distribution $c_n'$ in particular also includes microbial contamination of the aerosol 10, for example by bacteria or viruses, the total number $g_1$ serves as an indicator of a risk of infection and is therefore also referred to as a "germ indicator."

The $PM_{2.5}$ parameter $g_2$ is also determined from the source-dependent particle size distribution $c_n'$, which reflects the mass fraction of all aerosol particles 12 having particle diameters $d_p$ of less than 2.5 μm in the source-dependent aerosol part 10a, i.e., the exhaled air and a further quality parameter g for, in particular, the fine dust pollution of the source-dependent aerosol 10a. The $PM_{2.5}$ value also includes microbial contaminants in the air and thus also provides information about the microbial contamination of the source-dependent aerosol part 10a. In addition, a modified $PM_{2.5}$ parameter $g_3$ is determined, in which the calculation is based on a weighting depending on the relative humidity of the aerosol 10.

For a comprehensive assessment of the aerosol quality, the gas measuring unit 26 has further components not shown in FIG. 1, such as a hygrometer for determining the relative humidity, and sensors for determining volatile organic compounds, ozone, nitrogen oxides, sulfur oxides and/or carbon monoxide. Furthermore, parameters can be determined that are composed of a plurality of these parameters. For example, it is possible to determine an indicator of risk of infection which depends on the corrected particle rise distribution, concentrations of volatile organic compounds and $CO_2$ and relative humidity.

The number concentration of colony-forming particles (kbP per $m^3$) is also determined from the source-dependent particle size distribution $c_n'$, which number concentration is a measure of the microbial contamination of the air.

The steps of the method described above are carried out continuously when a computer program according to the invention is executed on the processor 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a source-dependent particle size distribution of an aerosol via an aerosol measuring device, the method comprising:

illuminating aerosol particles of the aerosol flowing through a measuring cell with a light beam;

detecting scattered light by a sensor, scattered light signals of the aerosol particles being detected spectroscopically in terms of intensity;

creating a size distribution of the scattered light signals representative of a particle size distribution;

determining a fraction parameter that corresponds to a fraction of a source-dependent aerosol part of the aerosol;

determining a particle size distribution of the aerosol particles; and determining the source-dependent particle size distribution of the aerosol from the fraction parameter and the particle size distribution, wherein the fraction parameter is determined from a comparison of a parameter of at least one gas component of the aerosol with a source-dependent reference value, wherein the parameter of the at least one gas component corresponds to a concentration of the gas component of the aerosol and/or in that the source-dependent reference value corresponds to a source-dependent concentration of the gas component, and wherein, to determine the fraction parameter, the concentration of carbon dioxide in the aerosol is compared with a reference value of between 1% and 10%, or between 3% and 5%, or with a reference value $k_{ref}$ of 4%.

2. The method according to claim 1, wherein the fraction parameter is determined from a comparison of two particle size distributions of the aerosol.

3. The method according to claim 1, wherein the parameter of the at least one gas component and/or the reference value is corrected.

4. The method according to claim 1, wherein the method is terminated if the fraction parameter falls below a first user-defined value and/or if the fraction parameter exceeds a second user-defined value.

5. The method according to claim 1, wherein the determined particle size distribution of the aerosol is corrected.

6. The method according to claim 1, wherein the source-dependent particle size distribution is determined by multiplying the particle size distribution of the aerosol by the fraction parameter.

7. The method according to claim 1, wherein a quality parameter of the aerosol is determined from at least part of the source-dependent particle size distribution.

8. The method according to claim 7, wherein the step of determining the quality parameter comprises summing at least part of the source-dependent particle size distribution.

9. The method according to claim 7, wherein the step of determining the quality parameter comprises a weighting operation that depends on the particle size of the aerosol particles and/or depends on the concentration of at least one gas component of the aerosol and/or depends on the relative humidity of the aerosol.

10. The method according to claim 1, wherein determining the fraction parameter and/or the particle size distribution and/or the source-dependent particle size distribution and/or the quality parameter comprises determining individual values and a statistical evaluation of the individual values.

11. A computer program having program code, which computer program is configured to carry out the steps of the method according to claim 1 when the computer program is executed on a computer or a corresponding computing unit or on an electronic processor of an aerosol measuring device.

12. A method for determining a source-dependent particle size distribution of an aerosol via an aerosol measuring device, the method comprising:
    illuminating aerosol particles of the aerosol flowing through a measuring cell with a light beam;
    detecting scattered light by a sensor, scattered light signals of the aerosol particles being detected spectroscopically in terms of intensity;
    creating a size distribution of the scattered light signals representative of a particle size distribution;
    determining a fraction parameter that corresponds to a fraction of a source-dependent aerosol part of the aerosol;
    determining a particle size distribution of the aerosol particles; and
    determining the source-dependent particle size distribution of the aerosol from the fraction parameter and the particle size distribution,
        wherein, to determine the fraction parameter, the concentration of carbon dioxide in the aerosol is compared with a reference value of between 1% and 10%, or between 3% and 5%, or with a reference value $k_{ref}$ of 4%.

13. An aerosol measuring device to determine a source-dependent particle size distribution of an aerosol, the measuring device comprising:
    a measuring cell, wherein aerosol particles of the aerosol are arranged in the measuring cell such that the aerosol particles are adapted to be illuminated by a light beam; and
    a sensor to detect scattered light of the aerosol particles, wherein scattered light signals of the aerosol particles are spectroscopically detected in terms of intensity such that a size distribution of the scattered light signals that is representative of a particle size distribution is created,
        wherein a fraction parameter is determined that corresponds to a fraction of a source-dependent aerosol part of the aerosol,
        wherein a particle size distribution of the aerosol particles is determined, and
        wherein the source-dependent particle size distribution of the aerosol is determined from the fraction parameter and the particle size distribution, and
        wherein, to determine the fraction parameter, a concentration of carbon dioxide in the aerosol is compared with a reference value of between 1% and 10%, or between 3% and 5%, or with a reference value $k_{ref}$ of 4%.

14. The aerosol measuring device according to claim 13, wherein the aerosol measuring device has an electronic processor that determines the fraction parameter, that determines the particle size distribution, or that determines the source-dependent particle size distribution.

15. The aerosol measuring device according to claim 13, further comprising a gas measuring unit that determines a concentration of at least one gas component of the aerosol, the gas measuring unit being configured to detect at least one of the following substances and/or parameters: carbon oxides, nitrogen oxides, sulfur oxides, ozone, volatile organic compounds, or relative humidity.

16. The aerosol measuring device according to claim 13, wherein the light beam has polychromatic light.

17. The aerosol measuring device according to claim 13, wherein a direction of movement of the aerosol particles in the measuring cell, the direction of the light beam in the measuring cell and the direction of the scattered light are arranged in pairs perpendicular to one another.

* * * * *